Aug. 18, 1953  K. T. FUEHRING  2,649,518

DIAPHRAGM ACTUATED ELECTRICAL SWITCH

Filed Jan. 10, 1950

INVENTOR

KARL T. FUEHRING

BY

ATTORNEYS

Patented Aug. 18, 1953

2,649,518

UNITED STATES PATENT OFFICE 2,649,518

DIAPHRAGM ACTUATED ELECTRICAL SWITCH

Karl T. Fuehring, Hollydale, Calif., assignor of one-half to Charles E. Moose, Los Angeles, Calif.

Application January 10, 1950, Serial No. 137,790

1 Claim. (Cl. 200—58)

My present invention has to do with an improved automatic switch for automatically opening and closing an electrical circuit by virtue of release and application of pressure upon a diaphragm.

More particularly, my improved switch is peculiarly adapted to be mounted in an automobile rim beneath a pneumatic tire thereon, so as to be operable in response to inflation and deflation of the tire to open and close a circuit to a remote signaling element, for indicating to the driver of the vehicle the pressure condition existing in any given tire on the vehicle. The present invention is in the nature of an improvement upon the device shown in my copending application, Serial No. 58,513, filed November 5, 1948.

For instance, in heavy trucks and trailers, particularly those which use double tires on each wheel, any deflation of one of the tires on a wheel often results in fire and other damage.

It is an object of the present invention to provide an improved switch which has particular utility as a switch to be mounted in the rim of a wheel beneath a pneumatic tire thereon.

Another object is to provide a switch which may be so mounted in the rim that a tire may be removed or installed without removal of or interference by the switch.

A still further object is a provision of a switch of this character which is extremely simple in construction, durable and efficient in operation. Other objects will appear hereinafter.

For the purpose of explaining my invention, but without intending thereby to limit its scope as defined by the appended claim, I shall now describe a preferred embodiment for which purpose I shall refer to the accompanying drawings, wherein:

Figure 1:
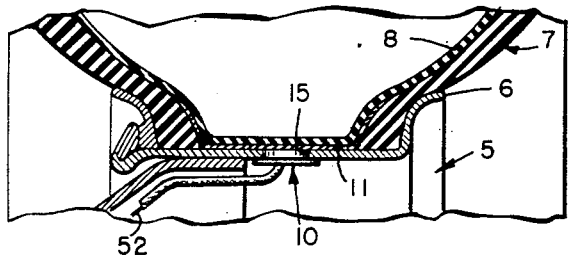
Fig. 1 is a cross-section of a tire, rim and wheel assembly in which my switch is mounted.

Referring to the drawings, I show in Fig. 1 a conventional wheel 5 having a conventional rim 6 upon which a conventional pneumatic tire 7 is mounted, the tire carrying an innertube 8.

For the reception of my switch, generally denoted 10, I provide a round hole 15 in the rim substantially midway between the sides of the rim so that the hole underlies the flap 11 under the innertube between the mounting flanges of the tire.

Figure 2:
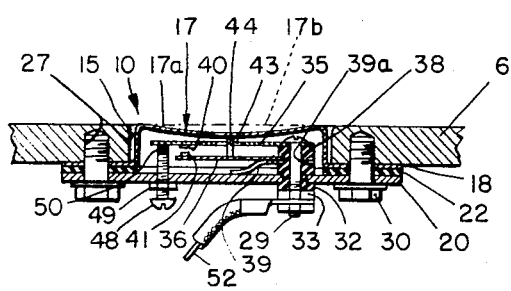
Fig. 2 is a section taken on line 2—2 of Fig. 3.
Figure 3:
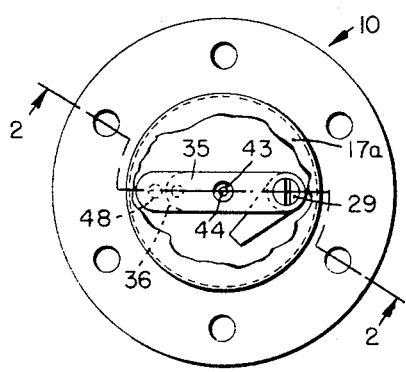
Fig. 3 is a top plan view of the switch with a portion of the diaphragmatic wall broken away for illustrative purposes.

Referring now to the switch device 10 which forms the subject-matter of my present invention, and referring particularly to Figs. 2 and 3, it will be observed that the switch comprises an inverted cup-shaped casing 17 having a flat, radially disposed, peripheral attaching flange 18. The top and wall 17a of the casing is made of thin resilient metal so that it functions as a resilient diaphragm.

A bottom cover plate 20 forms a closure or bottom end wall for the casing, there being a gasket 22 interposed between the plate 20 and the flange 18. A circumferential row of holes 27 are drilled and tapped in the rim so that the casing and cover plate may be secured in assembly and secured to the rim by cap screws 30.

The rim, and consequently the plate 20 and casing are conductively connected to one leg 31 of the electrical circuit of the vehicle.

On a post 29, carried by but insulated from the plate, a washer 32 and a nut 33 are mounted, the inner end portion of the post supporting a pair of substantially parallel spaced switch arms 35, 36, the upper arm 35 of which is insulated from the arm 36 and from the plate and casing by rubber washers 38, mounted around the post. A metallic element 39 has an oversized hole 39a passing the post and is disposed between the rubber washers against arm 36, its other end bearing against the metallic plate 20 to establish an electrical connection between the plate and arm 36. A pair of opposed contact elements 40, 41 are carried respectively by the switch arms 35, 36. The upper arm 35 has an opening 43 therethrough, and a pin 44 of smaller diameter than the opening is carried by arm 36 and projects upwardly through opening 43 to bear against the inner surface of the diaphragm or casing wall 17a.

Arm 35 is longer than arm 36 and an adjusting screw 48 carrying a lock nut 49 is threaded through plate 20 and has on its inner end an insulated bumper 50 which engages the free end portion of switch arm 35. Thus, by screwing the screw 48 inwardly or outwardly, the clearance between the contacts may be varied, and thus vary the amount of flexure of the diaphragm which may be permitted before closing of the circuit.

Said leg of the electric circuit is completed by a wire 52, which wire is connected to arm 35 through post 29 and leads to one terminal of a signaling element 60, the other terminal of the signaling element being connected to the other leg of the circuit by wire 61.

In operation, when the innertube of the tire is properly inflated, it bears downwardly against the diaphragm 17 flexing it inwardly to the position indicated in broken line 17b, and thus causes the pin 44 to maintain the switch arm 36 so flexed that its contact 41 is out of engagement with contact 40 on arm 35. However, as the innertube becomes deflated sufficiently to enable the diaphragm 17 to flex upwardly to the broken line position shown at 17b in Fig. 2, by virtue of the resiliency of the diaphragm, said contacts engage and close the circuit.

Figure 4:
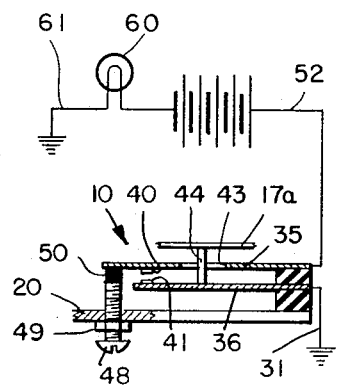
Fig. 4 is a diagram showing the relation of my switch to a signaling circuit.

The signaling element 60 shown in Fig. 4 may typify an electric light or electric bell or buzzer or both, which may be positioned in the driver's compartment of the vehicle. In practice, there is preferably one of the signal elements corresponding to each tire on the vehicle and there is one of the switch elements 10 mounted in each rim. The wire 52 is preferably connected to the signaling element through a brush element, a portion of which is carried by the wheel and a portion of which is carried by the frame of the vehicle. A desirable arrangement of this sort is shown and fully described in my said copending application.

I claim:

In an electrical switch, a casing having a diaphragmatic top wall, a continuous side wall having a surrounding flange and a closure plate secured to said flange in sealing relationship thereto, a post carried by said closure plate and disposed in said casing, a first switch arm supported by said post and extending transversely of the casing adjacent said top wall, said switch arm having an opening therethrough, a second resilient switch arm supported by said post and disposed beneath said first switch arm, said arms having electrical contact elements engageable with each other, and a pin carried by the second switch arm and projecting through said hole into position engageable by said top wall whereby flexure of said top wall actuates said second switch arm.

KARL T. FUEHRING.

References Cited in the file of this patent

UNITED STATES PATENTS

| Number | Name | Date |
| --- | --- | --- |
| 2,008,163 | Walder | July 16, 1935 |
| 2,051,654 | Sanford et al. | Aug. 18, 1936 |
| 2,090,184 | Card | Aug. 17, 1937 |
| 2,345,023 | Yarbrough et al. | Mar. 28, 1944 |
| 2,500,413 | Horlacher | Mar. 14, 1950 |